United States Patent
Thompson

(10) Patent No.: US 7,143,143 B1
(45) Date of Patent: Nov. 28, 2006

(54) SYSTEM AND METHOD FOR DISTRIBUTED CACHING USING MULTICAST REPLICATION

(75) Inventor: R. Donald Thompson, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 1013 days.

(21) Appl. No.: 09/699,239

(22) Filed: Oct. 27, 2000

(51) Int. Cl.
*G06F 15/16* (2006.01)
*H03M 7/34* (2006.01)
*G11C 8/00* (2006.01)

(52) U.S. Cl. ............... 709/217; 709/201; 709/218; 709/245; 365/230.01; 365/230.03; 341/51; 341/106

(58) Field of Classification Search .......... 709/201, 709/217–221, 245; 365/230.01, 230.03; 341/51, 106
See application file for complete search history.

(56) References Cited

U.S. PATENT DOCUMENTS

| | | | |
|---|---|---|---|
| 5,406,278 A * | 4/1995 | Graybill et al. | 341/51 |
| 6,134,597 A * | 10/2000 | Rieth et al. | 709/237 |
| 6,175,833 B1 * | 1/2001 | West et al. | 707/102 |
| 6,201,755 B1 * | 3/2001 | Pillar et al. | 365/230.01 |
| 6,393,468 B1 * | 5/2002 | McGee | 709/218 |
| 6,453,404 B1 * | 9/2002 | Bereznyi et al. | 711/171 |
| 6,505,236 B1 * | 1/2003 | Pollack | 709/206 |
| 6,516,338 B1 * | 2/2003 | Landsman et al. | 709/203 |
| 6,643,641 B1 * | 11/2003 | Snyder | 707/4 |
| 6,763,370 B1 * | 7/2004 | Schmeidler et al. | 709/203 |

OTHER PUBLICATIONS

"Hash table" Wikipedia, Google.*
Dobosiewicz, W., "Linear Probing Sort," *Computer Journal* 34(4):370-373, 1991.
Flajolet, P., P. Poblete, and A. Viola, "On the Analysis of Linear Probing Hashing," *Algorithmica* 22(4):490-515, 1998.
Kawai, E., K. Osuga, K. Chinen, and S. Yamaguchi, "Duplicated Hashing Routing: A Robust Algorithm for a Distributed WWW Cache System," *IEICE Transactions of Information and Systems* E83-D(5):1039-1047, 2000.
Knott, G.D., and P. de la Torre, "Hash Table Collision Resolution With Direct Chaining," *Journal of Algorithms* 10(1):20-34, 1989.
Kurcewicz, M., W. Sylwestrzak, and A. Wierzbicki, "A Distributed WWW Cache," *Computer Networks and ISDN Systems* 30(22-23):2261-2267, 1998.
Larson, P.-Å., "Linear Hashing With Overflow-Handling by Linear Probing," *ACM Transactions on Database Systems* 10(1):75-89, 1985.
Povey, D., and J. Harrison, "A Distributed Internet Cache," *Australian Computer Science Communications* 19(1):175-184, 1997.

(Continued)

*Primary Examiner*—Jeffrey Pwu
(74) *Attorney, Agent, or Firm*—Christensen O'Connor Johnson Kindness PLLC

(57) ABSTRACT

A system and method for transferring multiple portions of data utilizing a distributed cache are disclosed. A content server obtains a request for content data and associates an identifier with the request. The content server returns a first portion of the data with the request and stores a second portion of the data in a cache according to the first identifier. Thereafter, the content server receives a request for the remaining portion of the provider data and associates a second identifier with the second request. If the second identifier matches the first identifier, the content server returns the data stored according to the first identifier. Additionally, the content server implements and utilizes a click server having multiple cache servers in which multi-cache replication is utilized to store identical contents in each cache server.

20 Claims, 9 Drawing Sheets

OTHER PUBLICATIONS

Touch, J., and A.S. Hughes, "LSAM Proxy Cache: A Multicast Distributed Virtual Cache," *Computer Networks and ISDN Systems* 30(22-23):2245-2252, 1998.

Yoshida, A., "MOWS: Distributed Web and Cache Server in JAVA," *Computer Networks and Systems* 29(8-13):965-975, 1997.

* cited by examiner

SYSTEM AND METHOD FOR DISTRIBUTED CACHING USING MULTICAST REPLICATION

FIELD OF THE INVENTION

In general, the present invention relates to computer software, and in particular, to a system and method for processing multi-portioned data in a distributed cache system utilizing multi-cast replication.

BACKGROUND OF THE INVENTION

Generally described, networks, such as the Internet, allow computer users to request and view content provided by a variety of other computers on the network, commonly known as content providers. Oftentimes, a content provider receives a request for content from a client computer having a browser application and returns the requested content, along with some embedded advertisement media, in the form of an Internet Web page.

In a first content delivery system configuration, the browser application requests content data from the content provider. In turn, the content provider generates a portion of the content data and requests the advertisement media portion of the content data from a third party server, such as an advertisement media server.

Generally, an advertisement media server returns both advertisement media corresponding to the content request and an Internet redirection reference in the event the user wishes to access the advertisement provider via the Internet. The content provider server receives the advertisement media and redirection reference and provides them to the browser application. Accordingly, if the user viewing an advertisement wishes to access the advertisement provider, he or she may click on the advertisement and an Internet Web site corresponding to the Internet redirection reference is displayed.

In a second content delivery system configuration, the content provider may be restricted from directly providing the advertisement media and the redirection reference to the browser application. In such a system, the browser application requests content from the content provider server. Instead of returning the advertisement media and redirection reference, the content provider instructs the browser application to obtain the advertisement media data and the redirection reference data from a third party server on the network. However, when the browser application requests the advertisement content data from the third party server, network protocols can prevent the third party server from returning both the advertisement media and the redirection reference. Often, the advertisement media is transferred to the browser application while the redirection reference is lost. In such an instance, if a user viewing the advertisement wishes to access the advertisement provider, the redirection request cannot be completed because the redirection reference was not transferred by the third party server.

Accordingly, there is a need for a system and method for processing data having multiple portions and for transferring the data in response to requests for the data portions.

SUMMARY OF THE INVENTION

In accordance with this invention, a system and method for transferring multiple portions of data utilizing a distributed cache are provided. A content server obtains a request for content data and associates an identifier with the request. The content server returns a first portion of the data with the request and stores a second portion of the data in a cache according to the first identifier. Thereafter, the content server receives a request for the remaining portion of the provider data and associates a second identifier with the second request. If the second identifier matches the first identifier, the content server returns the second portion of the data. Additionally, the content server includes a click server having a distributed cache configuration in which multi-cache replication is utilized to store data process data requests.

In accordance with other aspects of this invention, a computer implementable method for associating data with a data request is provided. In accordance with the method, a request for provider data having a first and second portion is obtained. A first identifier is associated with the request for the provider data and the first portion of the provider data is returned. The second portion of the provider data is stored in a memory according to the first identifier. Thereafter, a request for the second portion of the provider data is obtained and a second identifier is associated with the request for the second portion of the provider data. The second portion of the provider data is returned only if the second identifier matches the first identifier.

In accordance with another aspect of the present invention, a computer system for providing data to a requesting party is provided. The computer system includes at least one content requester for requesting provider data and a content server in communication with the content requester and operable to provide a first and second portion of the provider data to the content requester. Upon receiving a first request for the provider data from the content requester, the content server returns the first portion of the provider data and stores the second portion of the provider data according to a first identifier corresponding to the first request. Additionally, the content server returns a second portion of the provider data upon receiving a second request for the provider data from the content requester if a second identifier corresponding to the second request matches the first identifier.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE INVENTION

Figure 12:
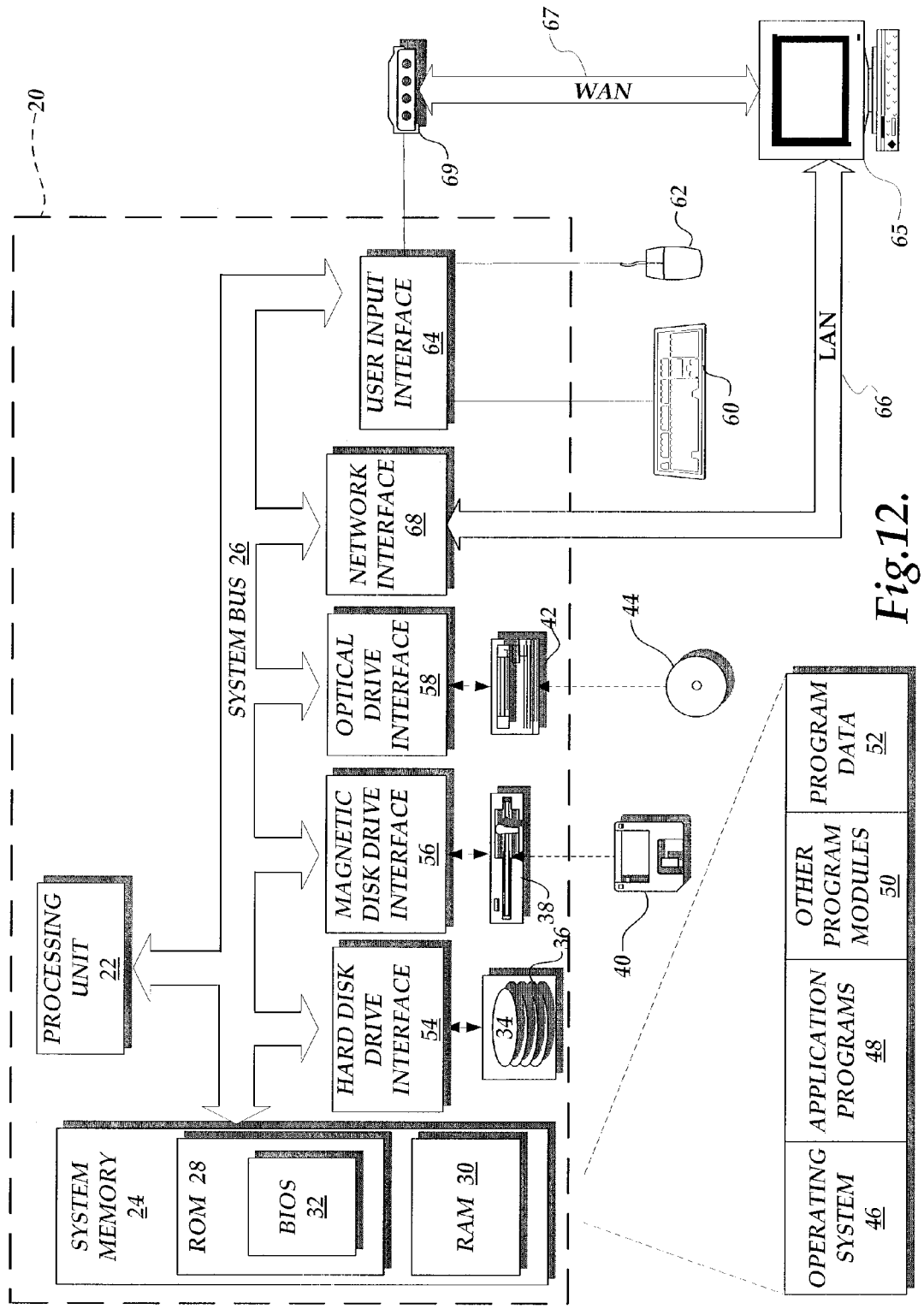
FIG. 12 is a block diagram of a computing system environment suitable for use in implementing the present invention.

FIG. 12 illustrates an example of a suitable computing system environment in which the invention may be implemented. The computing system environment is only one example of a suitable computing environment and is not intended to suggest any limitation as to the scope of use or functionality of the invention. Neither should the computing environment be interpreted as having any dependency requirement relating to any one or combination of components illustrated in the exemplary operating environment.

The invention is operational in numerous other general purpose or special computing system environments or configurations other than shown in FIG. 12. Example of well known computing systems, environments, and/or configurations that may be suitable for implementing the invention include, but are not limited to personal computers, server computers, laptop devices, multiprocessor systems, microprocessor-based systems, network PCs, minicomputers, mainframe computers, distributed computing environments that include any of the above systems or the like.

The invention may be described in the general context of computer-executable instructions, such as program modules, being executed by a computer. Generally, program modules include routines, programs, objects, components, data structures, etc. that perform a particular task or implement particular abstract data types. The invention may be also practiced in distributed computing environments where tasks are performed by remote processing devices that are linked through a communications network. In a distributed computing environment, program modules may be located in both local and remote computer storage media including memory storage devices.

With reference to FIG. 12, an exemplary system for implementing the invention includes a general purpose computing device in the form of a computer 20. Components of a computer 20 include, but are not limited to, a processing unit 22, a system memory 24, and a system bus 26 that couples various system components including the system memory to the processor. The system bus may be any of several types of bus structures including a memory bus or memory controller, peripheral bus, and a local bus using any of a variety of bus architectures. By way of example, not limitation, such architectures include Industry Standard Architecture (ISA) normal capitalization bus, Micro Channel Architecture (MCA) bus, Enhanced ISA (EISA) bus, Video Electronics Standards Association (VESA) local bus, and Peripheral Component Interconnect (PCI) bus also known as a Mezzanine bus.

The computer 20 typically includes a variety of computer-readable media. Computer-readable media can be any available media that can be accessed by the computer 20 and includes both volatile and non-volatile media, removable and non-removable media. By way of example, and not limitation, computer-readable media may comprise computer storage media and communication media. Computer storage media includes, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which can be used to store the desired information and which can be accessed by the computer 20.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 24 includes computer storage media in the form of volatile and/or non-volatile memory such as read only memory (ROM) 28 and random access memory (RAM) 30. A basic input/output system 32 (BIOS), containing the basic routines that help to transfer information between elements within the computer 20, such as during start-up, is typically stored in ROM 28. RAM 30 typically contains data and/or program modules that are immediately accessible to and/or presently being operated on by the processing unit 22. By way of example, and not limitation, FIG. 12 illustrates an operating system 46, application programs 48, other program modules 50, and program data 52.

Figure 7:
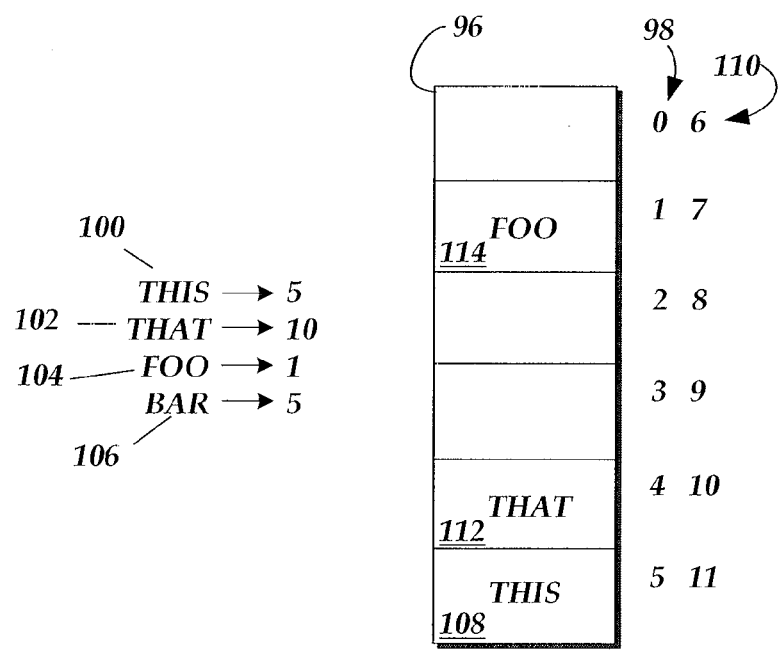
FIG. 7 is a block diagram of the hash table cache of FIG. 6 illustrating the insertion of a hash table cache element.

The computer 20 may also include removable/non-removable, volatile/non-volatile computer storage media. By way of example only, FIG. 7 illustrates a hard disk drive 36 that reads from or writes to non-removable, non-volatile magnetic media 38, a magnetic drive 38 that reads from or writes to a removable, non-volatile magnetic disk 40, and an optical disk drive 42 that reads from or writes to a removal, non-volatile optical disk 44, such as CD-ROM or other optical media. Other removable/non-removable, volatile/non-volatile computer storage media that can be used in the exemplary operating environment include, but are not limited to, magnetic tape cassettes, flash memory cards, DVD, digital video tape, Bernoulli cap cartridges, solid state RAM, solid state ROM, and the like. The hard disk drive 34, magnetic disk drive 38, and optical disk drive 42 may be connected to the system bus 26 by a hard disk drive interface 54, a magnetic disk drive interface 56, and an optical drive interface 58, respectively. Alternatively, the hard disk drive 34, magnetic disk drive 38, and optical disk drive 42 are typically connected to the system bus 26 by a Small Computer System Interface (SCSI).

The drives and their associate computer storage media discussed above and illustrated in FIG. 12, provide storage of computer-readable instructions, data structures, program modules and other data for the computer 20. In FIG. 12, for example, the hard disk drive 34 is illustrated as storing the operating system 46, application programs 48, other programs 50, and program data 52. Note that these components can either be the same as or different from the operating system 46, the other program modules 50, and the program data 52. A user may enter commands and information into the computer 20 through input devices such as a keyboard 60 and a pointing device 62, commonly referred to as a mouse, track ball or touch pad. Other input devices (not shown) may include a microphone, a joystick, a game pad, a satellite dish, a scanner, or the like. These and other input devices are often connected to the processing unit 22 through user input interface 64 and may be connected by other interface and bus structures, such as a parallel port, game port or other universal serial bus (USB).

The computer 20 may operate in a network environment using logical connections to one or more remote computers 65. The remote computer 65 may be a personal computer, a server, a router, a network PC, a peer device or other common network node, and typically includes many or all of the elements described above relative to the computer 20, although only a memory storage device has been illustrated in FIG. 12. The logical connections depicted in FIG. 12 include a local area network (LAN) 66 and a wide area network (WAN) 67, but also include other networks. Such network environments are commonplace in office, enterprise-wide computer networks, intranets, and the Internet.

When used in a LAN network environment, the computer 20 is connected to the LAN 66 through a network interface adapter 68. When used in a WAN network environment, the computer typically includes a modem 69 or other means for establishing communications over the WAN 68, such as the Internet. The modem 69, which may be internal or external, may be connected to the system bus 26 via the serial port interface or other appropriate mechanism. In a networked environment, program modules depicted relative to the computer 20, or portions thereof, may be stored in the remote memory storage device. By way of example, and not limitation, FIG. 12 illustrates remote application programs 48 as residing on memory device 24. It will be appreciated that the network connections shown are exemplary in other means of establishing communication between the computers may be used. Although many other internal components of the computer 20 are not shown, those of ordinary skill will appreciate that such components and their interconnection are well known. Accordingly, additional details concerning the internal construction of the computer 20 need not be disclosed in connection with the present invention.

Those skilled in the art will understand that program modules such as the operating system 46, the application programs 48 and data 52 are provided to the computer 20 via one of its memory storage devices, which may include ROM 28, RAM 30, hard disk drive 34, magnetic disk drive 38, or optical disk device 42. The hard disk drive 34 is used to store data 52 and the programs, including the operating system 46 and application programs 48.

When the computer 20 is turned on or reset, the BIOS 32, which is stored in ROM instructs the processing unit 22 to loan the operating system from the hard disk drive 34 into the RAM 30. Once the operating system 46 is loaded into RAM 30, the processing unit executes the operating system code and causes the visual elements associated with the user interface of the operating system to be displayed on the monitor 61. When an application program 48 is opened by a user, the program code and relevant data are read from the hard disk drive and stored in RAM 38.

As is appreciated by those skilled in the art, the World Wide Web (WWW) is a vast collection of interconnected or "hypertext" documents written in HyperText Markup Language (HTML) or other markup languages, that are electronically stored at WWW sites throughout the Internet. A WWW site is a server connected to the Internet that has mass storage facilities for storing hypertext documents and that runs administrative software for handling requests for those stored hypertext documents. A hypertext document normally includes a number of hyperlinks that may be identified in various way (e.g., highlighted portions of text) which link the document to other hypertext documents possibly stored at a WWW site elsewhere on the Internet. Each hyperlink is associated with a Uniform Resource Locator (URL) and provides the exact location of the linked document on a server connected to the Internet and describes the document. Thus, whenever a hypertext document is retrieved from any WWW server, the document is considered to be retrieved from the WWW. As is known to those skilled in the art, a WWW server may also includes facilities for storing and transmitting application programs, which is application programs written in the JAVA™ programming language from Sun Microsystems, for execution on a remote computer. Likewise WWW server may also include facilities for executing scripts or other application programs on the WWW server itself.

A consumer or other remote user may retrieve hypertext documents from the WWW via a WWW browser application program. The WWW browser is a software application program for providing a graphical user interface to the WWW. Upon request from the consumer via the WWW browser, the browser accesses and retrieves the desired hypertext document from the appropriate WWW server using the URL for the document and a protocol known as a HyperText Transfer Protocol (HTTP). HTTP is a higher-level protocol than TCP/IP and is designed specifically for the requirements of the WWW. It is used on top of TCP/IP to transfer hypertext documents between servers and clients. The WWW browser may also retrieve application programs from the WWW server, such as JAVA™ applets, for execution on the client computer.

The present invention relates to a system and method for storing data having multiple portions and for transferring the data to a requesting party. While the present invention will be described in relation to a system and method for delivering advertisements, which include an advertising media portion and an HREF portion, as will be readily understood by one skilled in the relevant art, the present invention is not limited to the delivery of advertisement media. Thus, it is to be understood that the embodiment is only by way of example and should not be construed as limiting.

Figure 1:
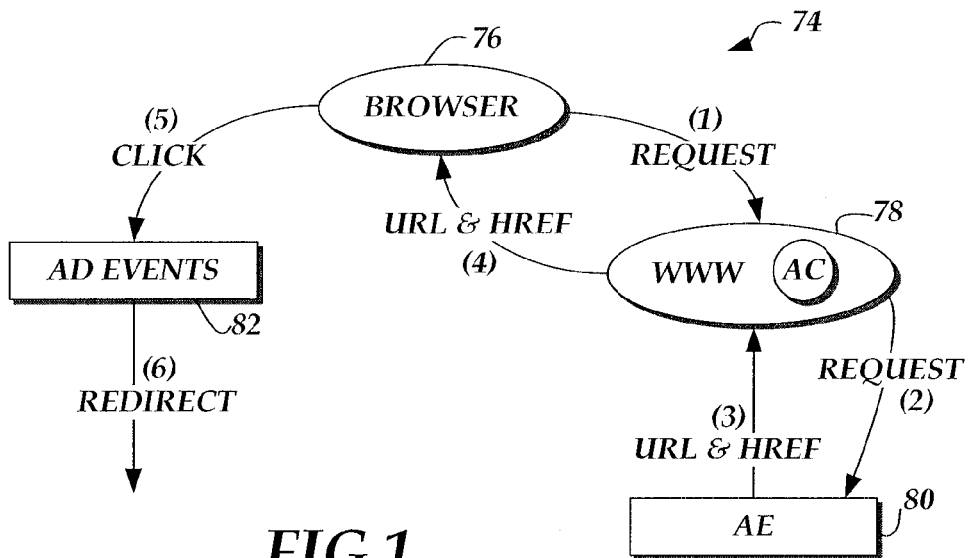
FIG. 1 is a block diagram of a first content delivery system for processing and delivering data in response to requests.

FIG. 1 is a block diagram illustrative of a first content delivery system 74. The system 74 includes a browser application 76, which requests content from a content server 78. The content server 78 processes the request and sends a request for advertisement media to an advertisement server 80. The advertisement server 80 processes the request and returns a URL associated with the advertisement media and an HREF redirection reference related to the advertisement material. The content server 78 returns the URL and HREF to the browser application 76. The browser application 76 accesses and displays the advertisement material located at the URL and in the event the user at the browser application 76 selects the advertisement, such as by "clicking" on the advertisement with a mouse, the browser application 76 utilizes the HREF to access an ad event server 82 which processes the redirection request and takes the user to another Web page indicated by the HREF.

Figure 2:
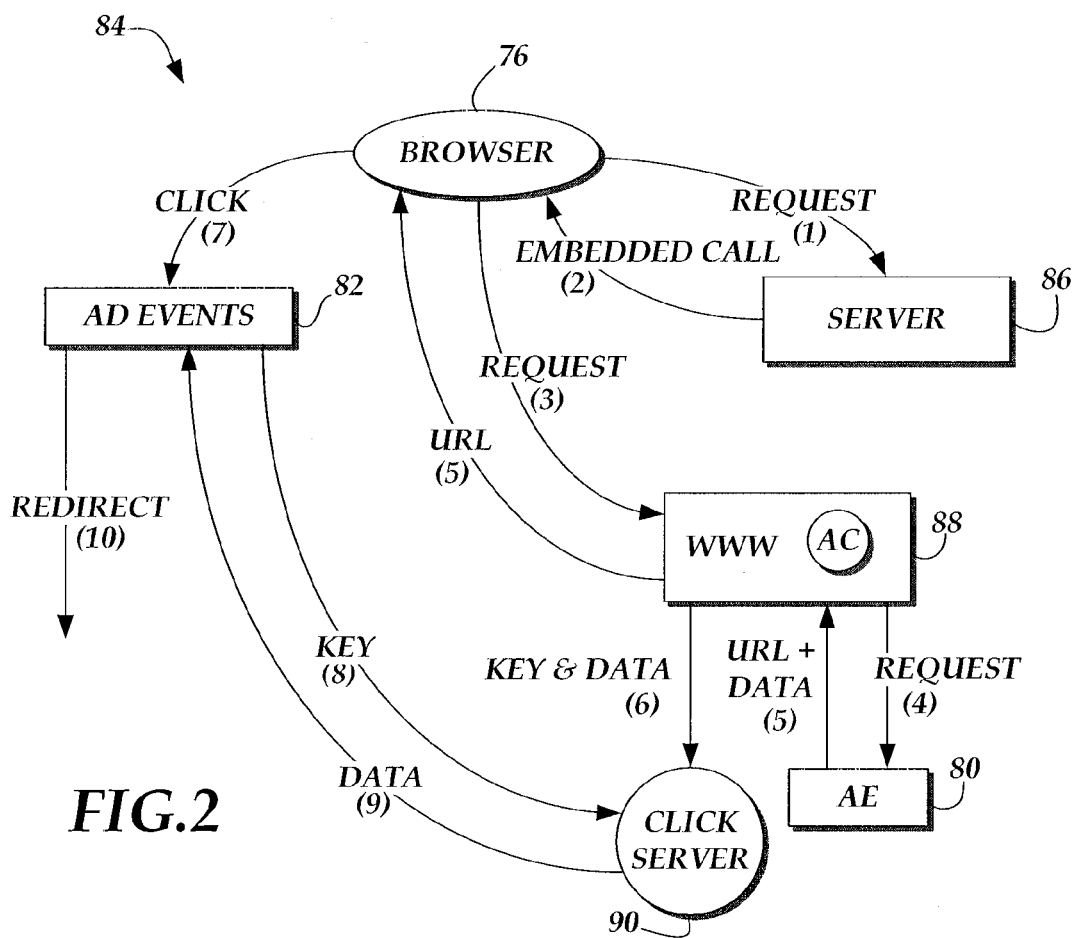
FIG. 2 is a block diagram of a second content delivery system for processing and delivering data in response to requests.

FIG. 2 is a block diagram illustrative of a second content delivery system 84 in which the delivery of advertisement content is not accomplished in a single data transmission. Similar to the first content delivery system 74, a browser application 76 requests content data from a content server 86. However, the content server 86 does not provide the advertisement media and HREF data to the browser application 76, but instead sends an embedded call for the browser application 76 to request the content from a third party content provider server 88. In turn, the third party content server 88 sends a request to an advertisement server 80 which returns a URL and HREF to the third party content server 88. However, system and/or network restrictions only allow the third party content server 88 to return the URL to the browser application 76. Accordingly, in a conventional system, the browser application 76 would only receive the URL and would not be able to process a subsequent HREF click request from the user.

In the present invention, however, the third party content server 88 also sends the HREF data and data identifying the requester to a click server 90. The click server stores the HREF data according to the key corresponding to the requester. If a redirection request is issued by the browser application 76 as a result of a user clicking action, the redirection request is sent to an ad events server 82, which in turn sends a request to the click server 90. A second key corresponding to the second request is generated and if the second key matches the first key, the HREF is sent to the ad event server 82 and processed by the browser application 76. Thus, the present invention allows the advertisement data to be divided and delivered to a requesting party in two or more portions.

Figure 3:
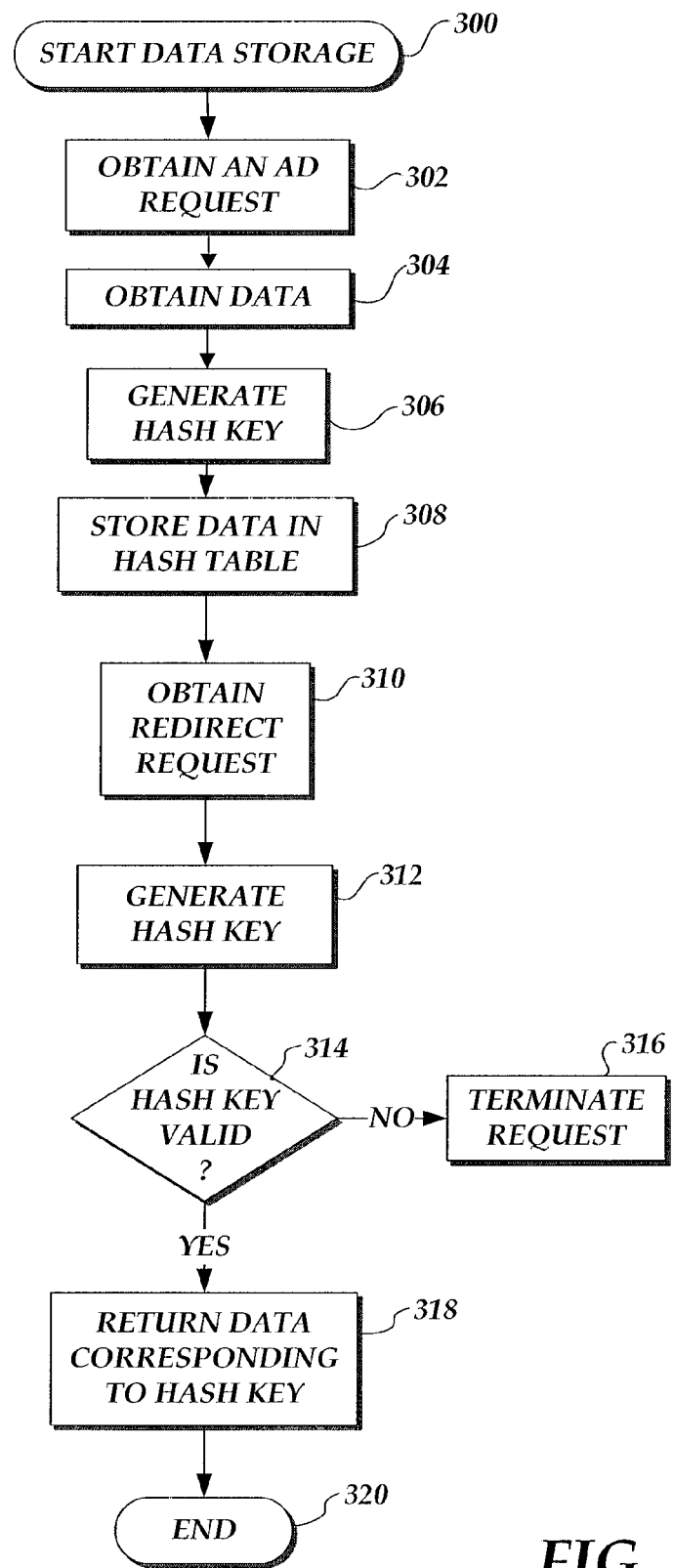
FIG. 3 is a flow diagram illustrative of a data storage and returning routine in accordance with the present invention.

FIG. 3 is a flow diagram of a data storage and retrieval routine 300 in accordance with the present invention. At block 302, a request for an advertisement is obtained. In an actual embodiment, as illustrated in FIG. 2, the request is originally issued by a browser application 76, accepted by the content server 86 and then passed along via the browser application 76 to a third party content server 88.

The request for the advertisement can include data regarding the content of the Internet Web page selected, data regarding the profile of the user of the browser application 76, and data identifying the user computer or the browser application 76, such as an Internet Protocol (IP) address or a Graphical User Identification (GUID). As will be readily understood, alternative delivery system configurations and methods of requesting data to be transferred are within the scope of the present invention.

At block 304, advertisement media and a corresponding HREF is obtained. In an actual embodiment, the content request is transferred to an advertisement server 80, which processes the request and returns the data. Alternatively, the third party server 88 may receive and process the request directly. As will be understood by one skilled in the relevant art, a variety of advertisement matching methods/systems utilized by the third party server 88 or the advertisement server 80 to obtain the advertisement media and HREF fall within the scope of the present invention.

At block 306, a hash key identifier corresponding to the requested data and/or the requester is generated. Since hash table data structures utilizing hash keys to store data are commonly known to those skilled in the relevant art, none are described in detail here. In general, a hashing algorithm converts data identifiers, including textual data, into a numeric value for location in a data structure, such as a table. Accordingly, different varieties of hashing algorithms or hash key storing data structures within with scope of the present invention.

In an actual embodiment of the present invention, the hash key is generated, at least in part, from data relating to the browser application 76 request for content. The data utilized to generate a hash key can include information such as a data identifier (e.g., a file name), an IP address of the browser application 76 on the Internet, a GUID of the browser application, data relating a user profile and/or data relating to the browser application content request on the network. As will be appreciated by one skilled in the relevant art, a variety of information, some of which may be unique to each browser application 76, may be utilized to generate hash table keys. Additionally, and as will be explained in greater detail below, it may be possible that a hash key algorithm may generate the same hash key for two different browser application content requests.

Figure 4:
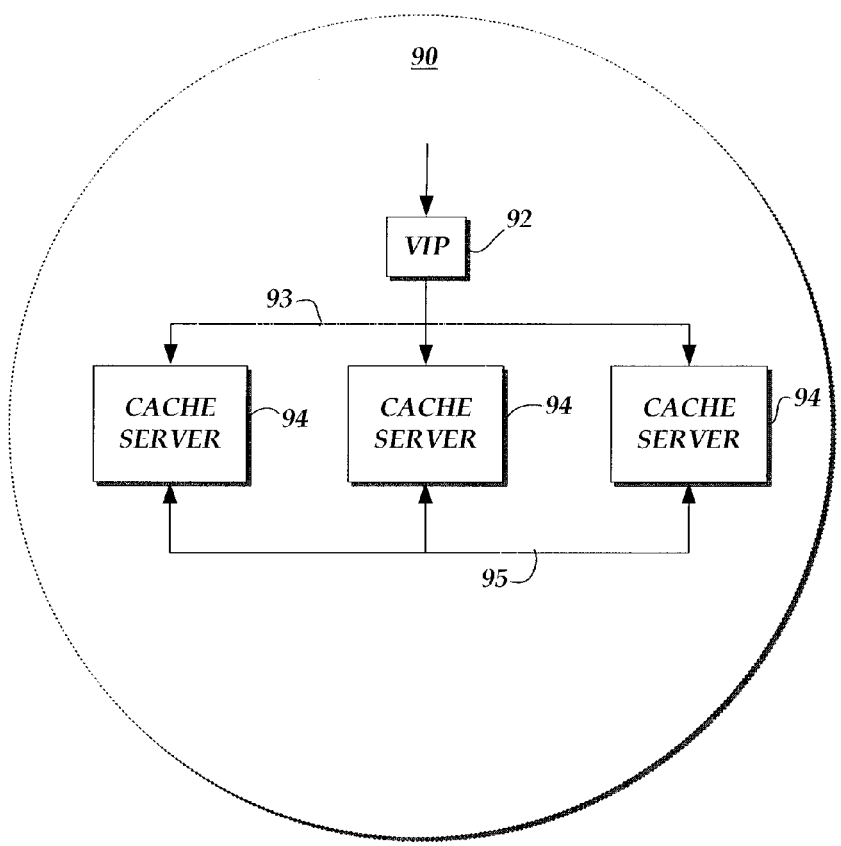
FIG. 4 is a block diagram illustrative of a click server architecture implementing a distributed cache system in accordance with the present invention.

At block 308, the HREF data associated with the advertisement request is stored in a cache hash table according to the hash key. In an actual embodiment, the third party server 88 stores the HREF data in the click server 90. FIG. 4 is a block diagram illustrative of a click server 90 in accordance with the present invention. The click server 90 includes a virtual interface protocol (VIP) 92 connected to multiple cache servers 94 via a communication channel 93. The cache servers are in parallel to one another and also in communication with one another via a back communication channel 95. Each cache server 94 stores data utilizing a hash table. With reference to FIG. 2, in an actual embodiment, the click server 90 obtains the HREF data and the hash key concurrently with the passing of the URL to the browser. Alternatively, the clicker server 90 may generate a hash key upon receiving the HREF data.

Upon completion of block 308, the overall advertisement data has been subdivided into two portions. The first portion, the URL, is returned to the browser application 76 with the original data request. The second portion, the HREF data, has been sent to the click server 90 and has been stored in a hash table 96 according to a hash key.

Returning to FIG. 3, at block 310, a request for a redirection reference is obtained. As illustrated in FIG. 2, the redirection request occurs when the user selects an advertisement on the browser application 76 by clicking on the advertisement. The browser application 76 sends the redirection request to advertisement events server 82. Because the browser application 76 does not have the HREF data, the advertisement events server 82 then requests the data from the click server 90. Similar to the initial content request, the second request includes a data identifier, and/or data identifying, the user request, the user profile and/or the browser application 76. At block 312, a second hash key is generated. In an actual embodiment, the same hash key generation method or algorithm utilized at block 304 to generate the first hash key is utilized to generate the second hash key. Accordingly, the second hash key should be identical to the first hash key. Similarly, the second hash key may be generated either by the advertisement events server 82 or by the click server 90.

At decision block 314, a test is made to determine whether the second hash key is valid. In an actual embodiment, the second hash key is compared to any hash keys that have been previously generated and still contain data in the hash table 96. If there are no matches, the second hash key is not considered to be valid and the request is terminated at block 316. If the hash key matches one of the hash keys in the hash table, then a second test is conducted by comparing the raw data utilized to generate the hash key. If the raw data from the stored data and the second request match, then the hash keys are assumed to be from the same request and the hash key is considered to be valid. The second test mitigates problems associated with the generation of the same hash key by two independent requests. As will be readily understood, alternative tests to determine the validity of the second hash table key are within the scope of the present invention. Additionally, the second test of matching the raw data from the browser application 76 request may be omitted.

If the second hash table key is valid at decision block 314, the data stored in the location according to the hash table key is returned at block 318. The process then terminates at block 320.

To facilitate the storage and retrieval of the HREF data in each cache 94, the present invention utilizes chaining in the event any hash key collisions occur. As will be readily understood by one skilled in the art, hash key collisions occur when the hash table key generating method or algorithm generates the same key for two distinct pieces of data. In such an event, the present invention stores the data in an alternate location.

In practice, when a command to store data is received by the VIP 92, one of the cache servers 94 is selected and a communication channel between the requesting server and the cache server 94 is created via the channel 93. Accordingly, the third party server 88 communicates directly with the selected cache server 94. Additionally, in an actual embodiment, once established, the VIP 92 maintains the outside server to cache server 94 connection for each subsequent communication. It will be apparent to one skilled in the relevant art that alternative caching structures, or storing facilities may be incorporated with the present invention.

Figure 5:
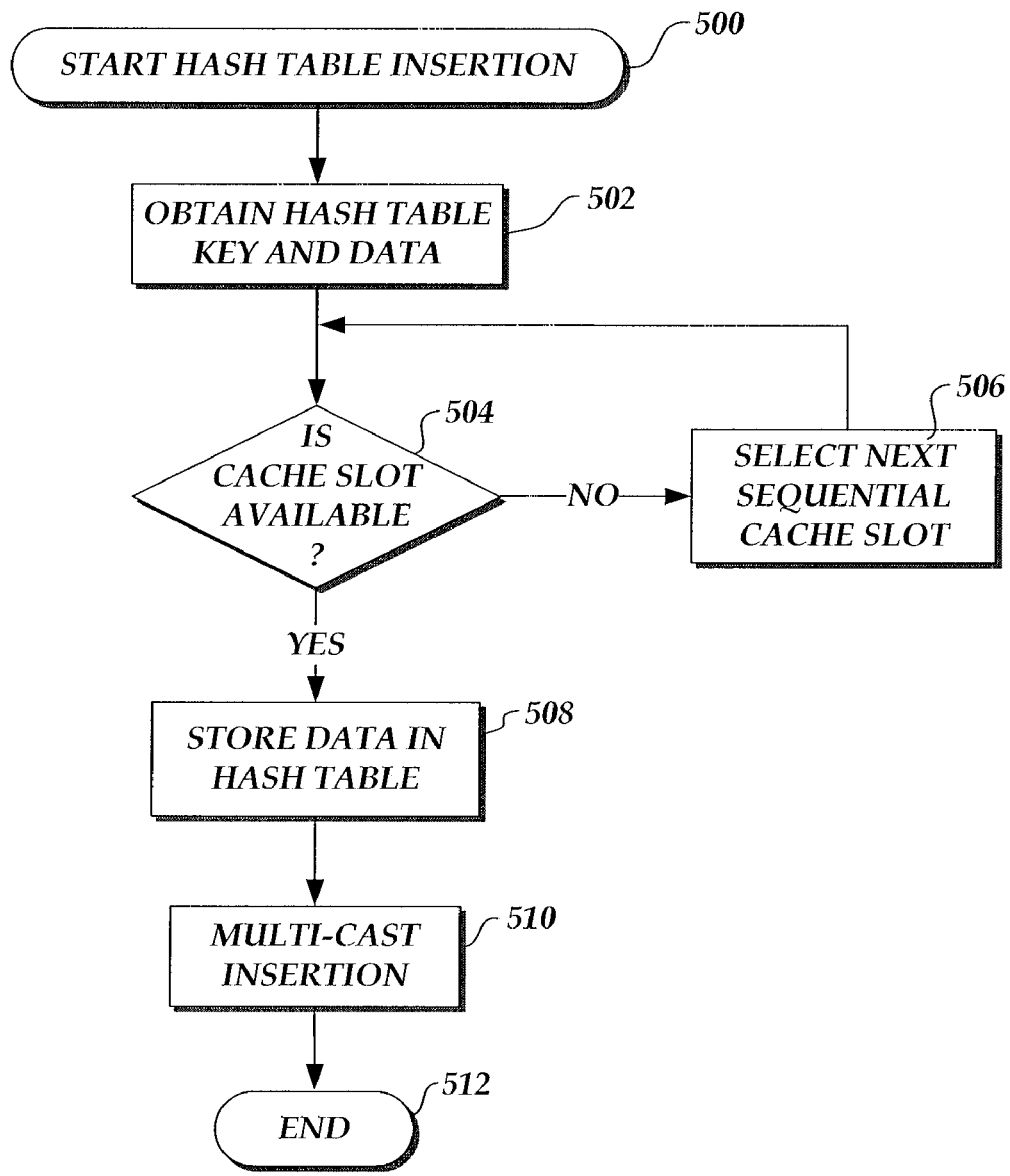
FIG. 5 is a flow diagram illustrative of a hash table insertion routine in accordance with the present invention.

FIG. 5 is a flow diagram illustrative of a hash table insertion routine 500 implemented by the click server cache 94 in accordance with the present invention. At block 502, a hash table key and data to be stored are obtained. As explained above, the hash table key is generated from data pertaining to the browser application 76 request utilizing a hashing algorithm. The hash table key may be generated by a third party server 88 or by the click server 90 upon obtaining the HREF data.

Figure 6:
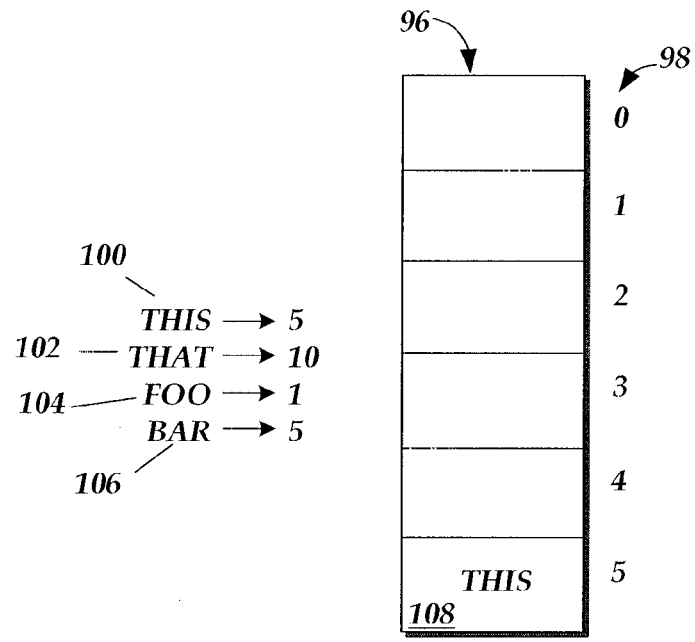
FIG. 6 is a block diagram illustrative of the contents of a hash table cache in accordance with the present invention.

At decision block 504, a test is made to determine whether a slot in cache corresponding to the generated hash table key is available. FIG. 6 is a block diagram illustrative of a cache server hash table 96 in accordance with the present invention. The hash table 96 includes a plurality of slots for storing data identified by numerical hash table keys 98. In this example, the hash table 96 includes six cache slots numbered sequentially from "0" to "5" and corresponding to potential hash table keys. It will be apparent to one skilled in the art that the hash table key table location need not be sequential and that the data may be stored in two or more locations.

Returning to FIG. 5, if the slot is available, the data is stored at the specified location in the hash table at block 508. If, however, the slot is not available at block 506, the next sequential cache slot is examined at block 506. Accordingly, blocks 504 and 506 are repeated until an available cache slot is found.

FIG. 6 also illustrates four pieces of data 100, 102, 104, and 106, which are to be inserted into the cache hash table 96. Each piece of data 100, 102, 104 and 106, corresponds to a hash table key which is illustrated in FIG. 6 alongside the data. For illustrative purposes, the first piece of data 100 "THIS" corresponds to a hash table key of "5", the second piece of data 102, "THAT", corresponds to a hash table key of "10", the third piece of data 104, "FOO", corresponds to a hash table key "1", and the fourth piece of data 106, "BAR", corresponds to a hash table key of "5".

As is shown in FIG. 6, the first piece of data 100, "THIS", is deposited in the hash table position 108 corresponding to the hash table key "5". Continuing to FIG. 7, the second piece of data 102, "THAT", corresponds to a hash table key of "10". In an actual embodiment, if the hash table 96 does not have sufficient locations to correspond to each potential hash key, the numbering of the hash table locations restarts at the beginning of the hash table 96 in sequential order as illustrated in FIG. 7 at 110. In the illustrative embodiment, the hash table key "10" is located at hash table position 112. Accordingly, because hash table position 112 is available, the second piece of data 102 is stored in this hash table position. With continued referenced to FIG. 7, hash table key "1", corresponding to the third piece of data 104, "FOO", is located at hash table position 114. Because no data is in hash table position 114, the third piece of data 104 is stored at that position.

Figure 8:
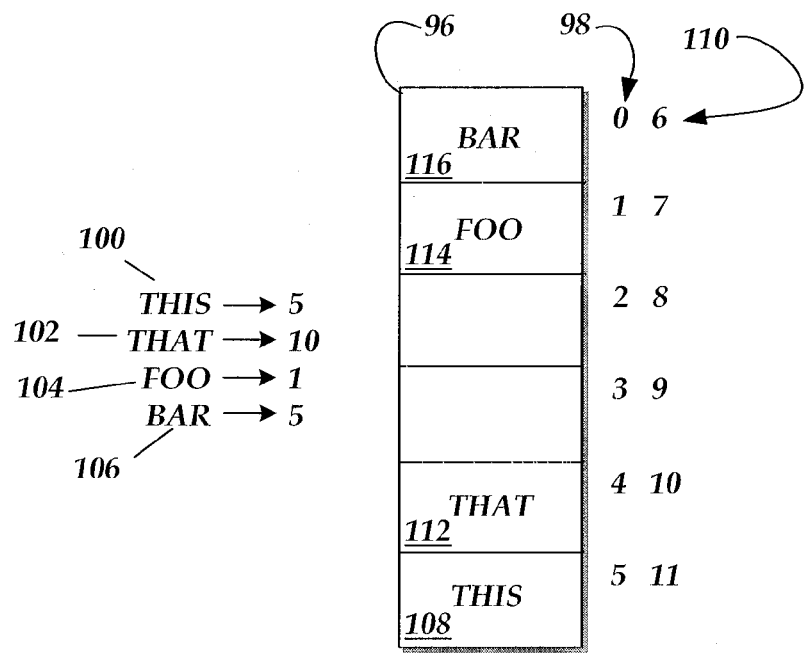
FIG. 8 is a block diagram of the hash table cache of FIG. 6 illustrating the insertion of a hash table cache element.

FIG. 8 is a block diagram illustrating a key collision and the insertion of data in accordance with the present invention. The fourth piece of data 106, "BAR", corresponds to a hash table key of "5." However, when the hash table position 108 associated with the hash table key of "5" is examined, the first piece of data 100 is already stored at this position. Accordingly, the fourth piece of data 106 cannot be stored at position 108. With reference to block 506 as described above, in the event a cache slot is unavailable, the next sequential block is obtained. In the illustrative embodiment, position 108 is the last position on the hash table 96. In this illustrative embodiment, the next available position would be position 116 at the top of hash table 96. As illustrated in FIG. 8, because there is no data stored at hash table position 116, the fourth piece of data 106 is stored at this position.

Referring again to FIG. 5, once the data is stored in cache 94, the cache server 94 multi-casts a request for any additional cache servers 94 to store the data at block 510. With reference to FIG. 4, in an actual embodiment, the cache servers 94 communicate to one another through the back communication channel 93. A multi-cast request is transmitted to each of the servers 94 in the click server 90, and each server 94 stores the data in the manner illustrated in routine 500. At block 512, the routine 500 terminates.

In an actual embodiment, each cache server 94 in the click server 90 maintains identical contents. Accordingly, a request to the cache for data can be processed by any one of the cache servers 94. As will be readily understood, there may be additional discrepancies with the processing of data such that the locations of particular data in each cache may not be identical. Additionally, some servers may experience data loss such that the contents are not always identical. The multi-cast replication permits similar, if not identical, cache contents.

Figure 9:
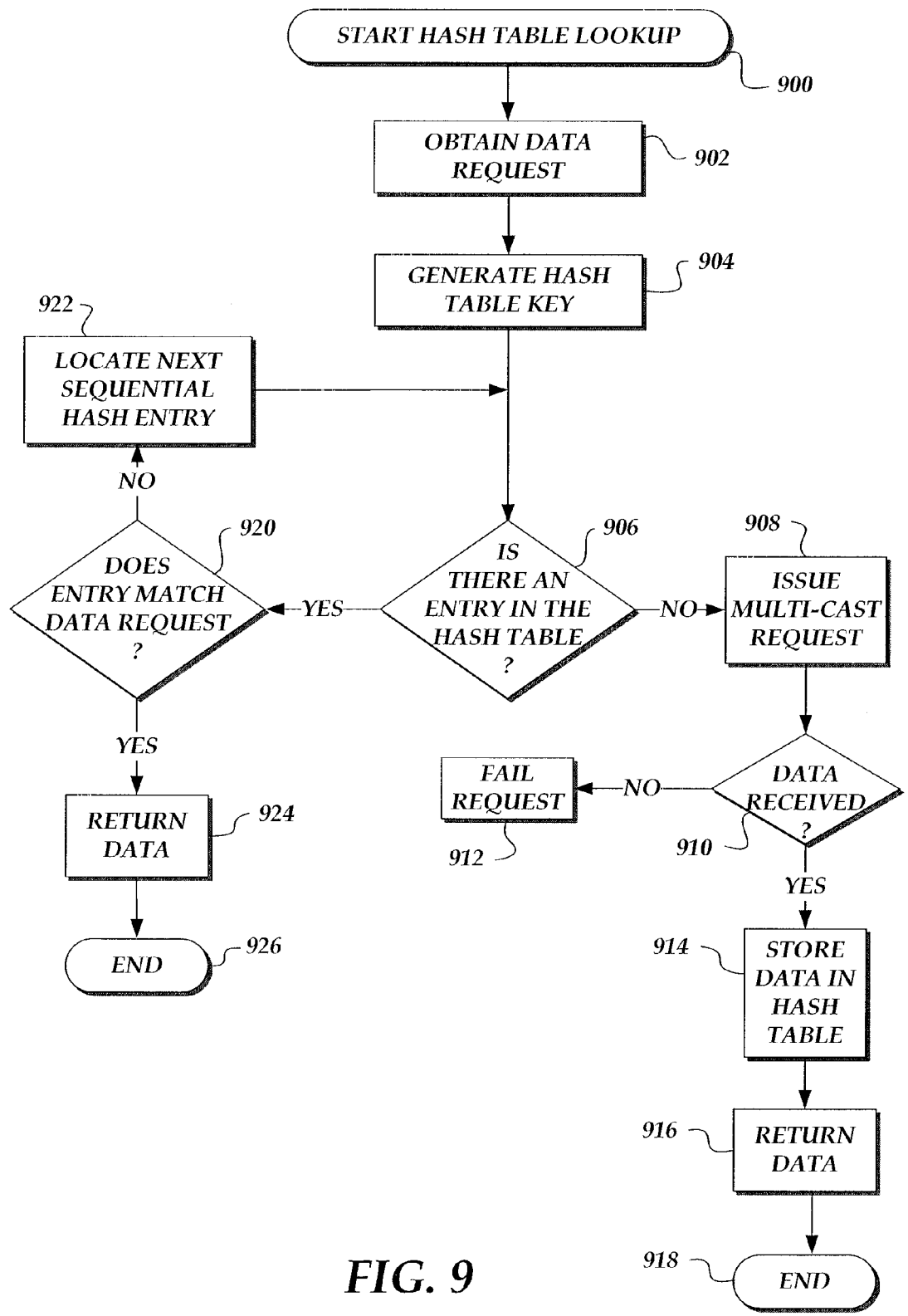
FIG. 9 is a flow diagram illustrative of a hash table look-up routine in accordance with the present invention.

FIG. 9 is a flow diagram illustrative of a hash table look up routine 900 for retrieving data once it has been stored in the cache server 94. At block 902, a request for data is obtained. At block 904, a hash key is generated. As has been explained above, a request for data often includes information regarding a data identifier, a user profile, the content, and/or the computer of the browser application 76. The same hash table key generating algorithms or methods utilized in block 502 is utilized to generate this hash table key. The hash table key may be generated by another server, such as the advertisement events server 82, or by the click server 90.

At decision block 906, a test is done to determine whether there is an entry in a hash table 96 matching the generated hash table key. As explained above, in an actual embodiment, upon obtaining a request for data, the VIP 92 of the click server selects a cache server 94 to process the request. If no locations match the hash table key, the cache server 94 issues a multi-cast request for the data at block 908. In an actual embodiment, the cache server 94 transmits a request across the back channel 95 to each of the connected servers 94. Alternatively, the cache server 94 may poll specific servers 94.

At decision block 910, a test is made to determine whether the data has been received. If the data has not been received, the request fails at block 912. Preferably, a specific time period is set for waiting for any other cache server 94 to respond to the request. If no response is received by the expiration of the time period, the request fails. If, however, a response is received at decision block 910, the data is stored in the hash table 96 of that specific cache server 94 at block 914. At block 916, the data is returned to the requesting party and the routine 900 terminates at block 918.

With reference to decision block 906, if there is an entry in the hash table 96 matching the hash key, a test is conducted to determine whether the raw data from the request for the data matches the raw data used to store the entry in the hash table as illustrated by decision block 920. Because the hashing algorithm may generate the same key for two distinct pieces of data, comparing the raw data from the data in memory and the request mitigates the incorrect transfer of data and allows for the use of chaining. If the raw data from the request does not match the raw data from the entry, the next sequential hash entry is located at block 922. The process then repeats to decision block 906. If the raw data from the request matches the raw data from the entry, the data is returned at block 924 and the routine 900 terminates at block 926.

Figure 10:
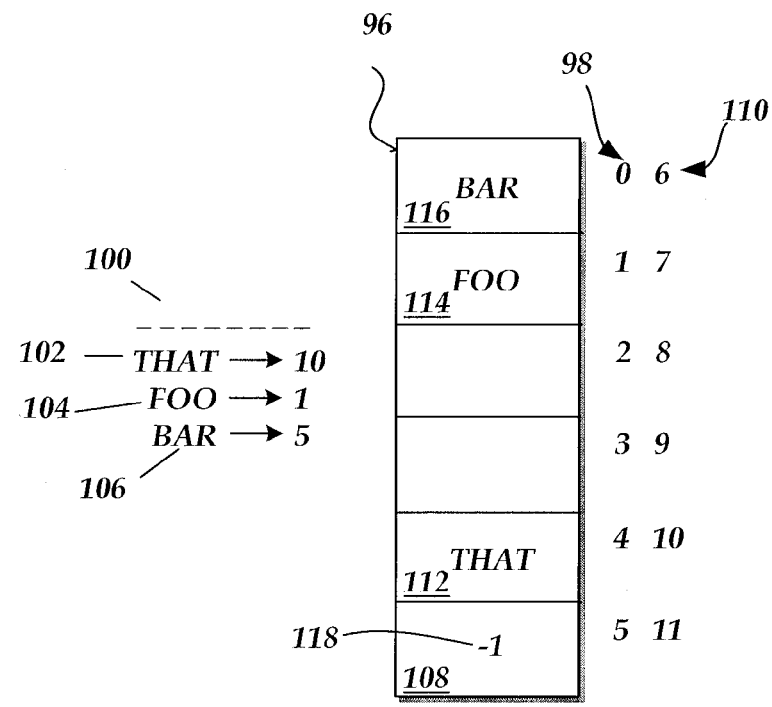
FIG. 10 is a block diagram of the hash table cache of FIG. 6 illustrating the removal of a hash table cache element.

FIG. 10 is a block diagram of the cache server hash table 96 illustrating the deletion of data. Specifically, FIG. 10 illustrates the use of a chaining identifier in accordance with the present invention. It will be appreciated by one skilled in the relevant art that cache servers 94 may periodically delete data, such as when data is unused for a specific period of time. Additionally, data may also be deleted according to instruction from a variety of sources. With reference to the use of chaining identifiers, the deletion of one or more data elements in the hash table 96 between an original key location and the next available location would prevent a subsequent retrieval of the data in the next available location as described in routine 900. For example and with reference to FIG. 10, assume the first piece of data 100 at position 108 is deleted either by expiration of the first piece of data 100 or by an express command to delete it. Accordingly, position 108 corresponding to a hash table key of "5" is now available. Subsequently, if a request for the fourth piece of data 106, "BAR", occurs, the data retrieval method would first examine location 108. In this case, it would find no data in the location and the assumption would be made that the fourth piece of data 106 does not exist. The present invention avoids this result in the manner described below.

The present invention inserts a chaining identifier 118 in a hash table 96 to replace a data element if the data element has been counted in determining a next available position in the event of a hash key collision. As illustrated in FIG. 10, the chaining identifier 118 is inserted at position 108 when the first piece of data 100 was deleted. The chaining identifier instructs the searching routine to continue to an additional sequential position to find a data element, namely, the fourth piece of data 106. The chaining identifier 118 can include a numerical value instructing the routine to jump to several positions in the hash table 96. Alternatively, the chaining identifier can also just be a single numerical value instructing the searcher to jump to the next hash table position. Moreover, in the event new data is to be stored in a location containing a chaining identifier 118, the chaining identifier 118 is deleted. The newly stored data causing the sequence represented by previously described blocks 920 and 922 (FIG. 9).

Figure 11:
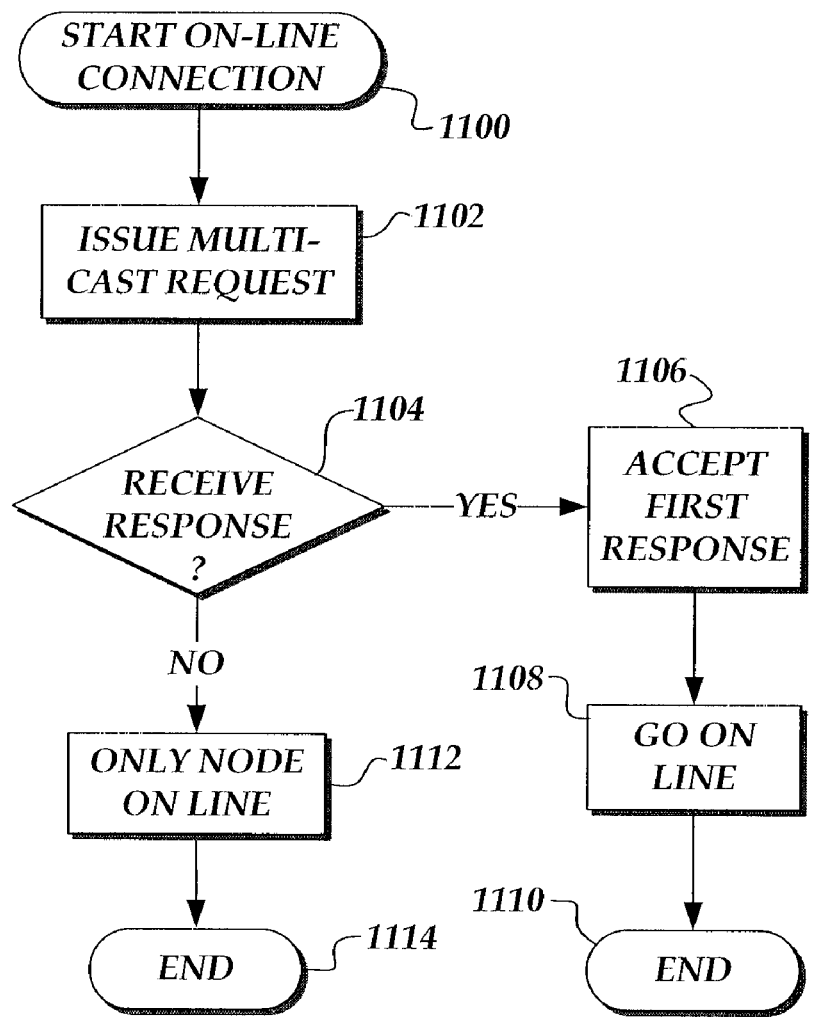
FIG. 11 is a flow diagram illustrative of an online connection routine in accordance with the present invention.

FIG. 11 illustrates a routine 1100 for the connection of a hash table server 94 in a distributed server environment. At block 1102, a multi-cast request for data is issued by the cache server 94. As illustrated in FIG. 4, the cache server issues the request via a back communication channel 95. At decision block 1104, a test is done to determine whether a response is received from the multi-cast request. If a response is received, at block 1106, the cache server accepts the first response and stores the data. Once a first response is received, any subsequent responses are rejected. Alternatively, the cache server 94 may poll designated cache servers 94 for data and/or may accept multiple responses for data error mitigation. The server then goes go on line at block 1108 and the routine 1100 terminates at block 1110.

Referring again to decision block 1104, if no response is received or no response is received within a given time period, the cache server 94 assumes it is the only node on line at block 1112 and goes on line. The process 1100 then terminates at block 1114.

The present invention facilitates the storage of data into two or more portions into hash table keys, which are stored according to data unique to each request. Utilizing a hash key generating method that incorporates requester information into the hash keys, the present invention facilitates the use of hash tables to store and recall various portions of the data while efficiently storing the data in a parallel distributed cache server environment. Moreover, the use of a distributed cache server environment facilitates the processing of the data portion requests concurrently.

While the presently preferred embodiment of the invention has been illustrated and described, it will be appreciated that various changes can be made therein without departing from the spirit and scope of the invention as defined by the appended claims. The embodiments of the invention in which an exclusive property or privilege is claimed are defined as follows:

The invention claimed is:

1. A method in a computer system for associating provider data including a first and second portion with a data request, wherein the first portion of the provider data includes a URL of advertisement media, the method comprising:
    obtaining a first request for provider data from a requesting party;
    in response to obtaining the first request:
        generating a first identifier corresponding to the first request;
        associating the first identifier with the first request for the provider data;
        returning the first portion of the provider data to the requesting party; and
        storing the second portion of the provider data according to the first identifier;
    obtaining the second request from the requesting party for the second portion of the provider data; and
    in response to obtaining a second request:
        generating a second identifier corresponding to the second request;
        associating the second identifier with the second request; and
        returning the second portion of the provider data to the requesting party if the second identifier matches the first identifier.

2. The method as recited in claim 1, wherein generating the first identifier includes generating a first hash table key corresponding to the request for the provider data; and wherein generating the second identifier includes generating a second hash table key corresponding to the request for the second portion of the provider data.

3. The method as recited in claim 2, wherein generating a first hash table key and generating a second hash table key each include utilizing a provider data IP address to generate the first hash table key and the second hash table key.

4. The method as recited in claim 2, wherein generating a first hash table key and generating a second hash table key each include utilizing a graphical user ID to generate the first hash table key and the second hash table key.

5. The method as recited in claim 1, wherein the second portion of the provider data includes an HREF relating to the content data.

6. The method as recited in claim 1, wherein the step of storing the second portion of provider data according to the first identifier includes:
   storing the second portion of the provider data in a first cache; and
   replicating the second portion of the provider data to at least a second cache.

7. The method as recited in claim 6, wherein the step of returning the second portion of the provider data includes:
   requesting data corresponding to the second identifier from a first cache;
   if no match is found, requesting data matching the second identifier from the second cache.

8. The method as recited in claim 7, wherein the step of requesting data from a second cache further includes replicating the request for data matching the second identifier to at least two or more cache.

9. A computer-readable medium having computer-executable instructions for performing the method recited in any one of claims 1–4, 5–8.

10. A computer system having a processor, a memory, and an operating system, the computer system operable to perform the method recited in any one of claims 1–4 and 5–8.

11. A computer system for providing data to a requesting party, the system comprising:
   at least one content requestor for requesting provider data;
   a content server in communication with the content requester and operable to provide a first and second portion of provider data to the content requester, wherein the second portion of the provider data is stored in a click server;
   wherein the content server generates a first identifier corresponding to a first request, returns the first portion of the provider data and stores the second portion of the provider data according to the first identifier upon receiving the first request for the provider data from the content requestor; and
   wherein the content server generates a second identifier corresponding to a second request, and returns the second portion of the provider data upon receiving the second request for the provider data from the content requester if the second identifier matches the first identifier.

12. The system as recited in claim 11, wherein the content server includes a cache for storing the second portion provider data.

13. The system as recited in claim 12, wherein the content server cache stores the second portion of the provider data in a hash table and wherein the first and second identifiers are hash table keys.

14. The system as recited in claim 12, further comprising a click server in communication with the content server and operable to store and recall the second portion of the provider data.

15. The system as recited in claim 14, wherein the click server includes two or more cache for storing the second portion of the provider data.

16. The system as recited in claim 15, wherein the two or more cache contain identical contents.

17. The system as recited in claim 11, wherein generating a first identifier includes generating a hash key identifier from data relating to the requesting party.

18. The system as recited in claim 17, wherein the data relating to the requesting party includes a data identifier, an IP address, and data relating to a content request.

19. The system as recited in claim 11, wherein the first portion of the provider data is associated with an advertisement media and the second portion of the provider data is a redirection reference to the advertisement media.

20. The system as recited in claim 11, wherein the click server includes a virtual interface protocol in communication with a plurality of cache servers, and wherein the second portion of the provider data is stored in at least one of the plurality of cache servers.

* * * * *